United States Patent
Grundmann et al.

[11] 3,897,891
[45] Aug. 5, 1975

[54] POLYESTER INJECTION ASSEMBLY

[75] Inventors: Volker R. Grundmann, Glastonbury; Douglas C. Glazier, Sr., Windsor Locks, both of Conn.

[73] Assignee: Litton Industrial Products, Inc., Berlin, Conn.

[22] Filed: Aug. 6, 1973

[21] Appl. No.: 385,730

[52] U.S. Cl............................ 222/263; 222/389
[51] Int. Cl............................................. B29f 1/06
[58] Field of Search........ 425/145, 245 R, 247, 449, 425/DIG. 229; 222/263, 146 HE, 387, 389, 222/334

[56] References Cited
UNITED STATES PATENTS

| | | | |
|---|---|---|---|
| 1,751,693 | 3/1930 | Gentle | 222/387 |
| 1,903,227 | 3/1933 | Snodgrass | 222/387 X |
| 2,142,081 | 1/1939 | Olive | 222/387 |
| 3,172,926 | 3/1965 | Sternberg | 425/247 X |
| 3,492,387 | 1/1970 | Larson | 425/249 X |

*Primary Examiner*—Robert B. Reeves
*Assistant Examiner*—David A. Scherbel
*Attorney, Agent, or Firm*—Arthur Gershman; Joseph R. Spalla

[57] ABSTRACT

An injection molding machine having a stuffing cylinder and piston for packing a plastic compound which is selectively in fluid communication with an injection cylinder and piston. The stuffing cylinder and piston provide a positive supply of plastic compound to the injection cylinder and piston and the combination is particularly suited to fiberglass reinforced plastic compounds which may have their physical characteristics deteriorated by more conventional injection molding apparatus which tend to break the reinforcing fibers.

7 Claims, 2 Drawing Figures

POLYESTER INJECTION ASSEMBLY

BACKGROUND OF THE INVENTION

This invention relates particularly to injection molding machines suited for molding fiberglass reinforced polyesters and other thermoset plastic compounds having fiberglass reinforcing. Fiberglass reinforced polyesters which are thermoset plastic materials are being used increasingly because of their desirable physical characteristics, a cost which is less than some thermosets and most thermoplastics, and dielectric qualities which make them particularly desirable for electrical apparatus. The wider use of fiberglass reinforced polyesters has been limited by inadequate apparatus for molding such compounds. Attempts to utilize conventional injection molding apparatus, including a screw, have not been successful because of the degradation of the fibers by the screw action. Attempts to use preformed billets to load an injection cylinder with the quantity of compound necessary for a single shot have not been commercially successful because of the relatively high cost involved. More particularly, with such apparatus it is necessary to provide special machinery to preform the billets as well as to handle the billets. The cost involved in such preforming and handling is obviously very great, and therefore, undesirable for any high production manufacturing system.

Apparatus which is generally related is shown in Scribner U.S. Pat. No. 3,158,263, issued Nov. 24, 1964, which shows a press having three coaxial rams which are operated in phased relationship in a manner which allows the intermittent charging of the press during continuous extruding operation. Because there is no corresponding requirement for intermittent charging and continuous molding in an injection molding machine, the structure and method of operation of the present invention accordingly differs significantly.

SUMMARY OF THE INVENTION

In accordance with the present invention, an injection molding machine is provided having a stuffing cylinder and piston and an injection cylinder and injection plunger. The injection cylinder and stuffing cylinder are selectively in fluid communication and the injection cylinder is provided with a nozzle disposed in fluid communication with the injection cylinder. The nozzle is dimensioned and configured for sealing engagement with the surface of a mold which is used with the apparatus of the invention. The stuffing cylinder is provided with a selectively openable loading port disposed in the wall thereof to allow passage of a plastic compound into the stuffing cylinder. A door is disposed in the loading port which is selectively positionable between an opened position and a closed position. In the latter position the door prevents plastic compound from escaping out of the stuffing cylinder. The door will ordinarily be provided with interlocks which will prevent operation of the stuffing piston when the door is in the opened position.

Control means are provided for urging the stuffing piston in a direction causing an increase in pressure at the nozzle when the stuffing cylinder and the injection cylinder are in fluid communication. The control means then urge the injection plunger in a direction causing higher pressure at the nozzle and injection into the mold.

Most preferable, the stuffing and injection cylinders will be coaxial and disposed in end to end relationship. The means for terminating fluid communication between the injection cylinder and the stuffing cylinder between the time of the beginning of urging of the injection plunger and completion of injection into the mold comprises the engagement of the injection plunger with the injection cylinder. Ordinarily, means are provided for terminating urging of the stuffing piston when the injection plunger enters the injection cylinder.

It has been found that the apparatus in accordance with the invention satisfies the various objects of the invention. One such object is to provide a novel injection molding machine which is capable of handling fiberglass reinforced plastic compound without damaging the fiberglass elements.

Another object of the invention is to provide apparatus which does not require preforming of plastic compound.

Still another object of the invention is to provide apparatus which, while being particularly suitable for molding fiberglass reinforced plastic compound, such as polyester compounds, will also be capable of handling other thermoset plastic compounds which do not include fiberglass elements.

DESCRIPTION OF THE PREFERRED EMBODIMENT

Figure 1:
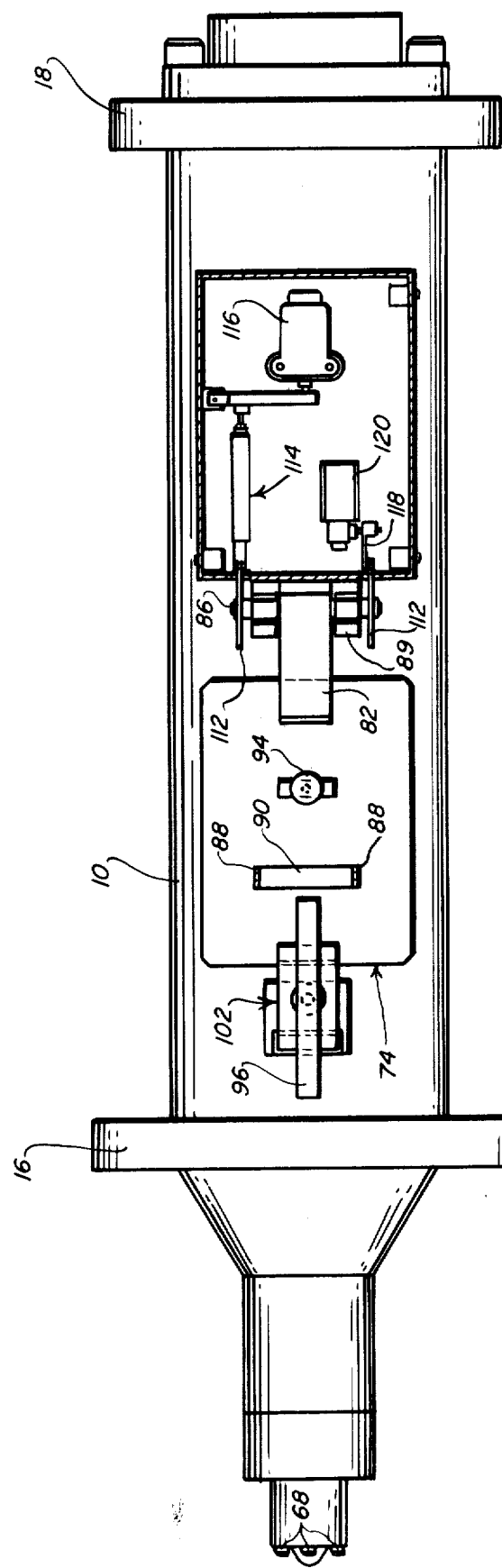
FIG. 1 is a top view of the injection mechanism incorporating the invention.
Figure 2:
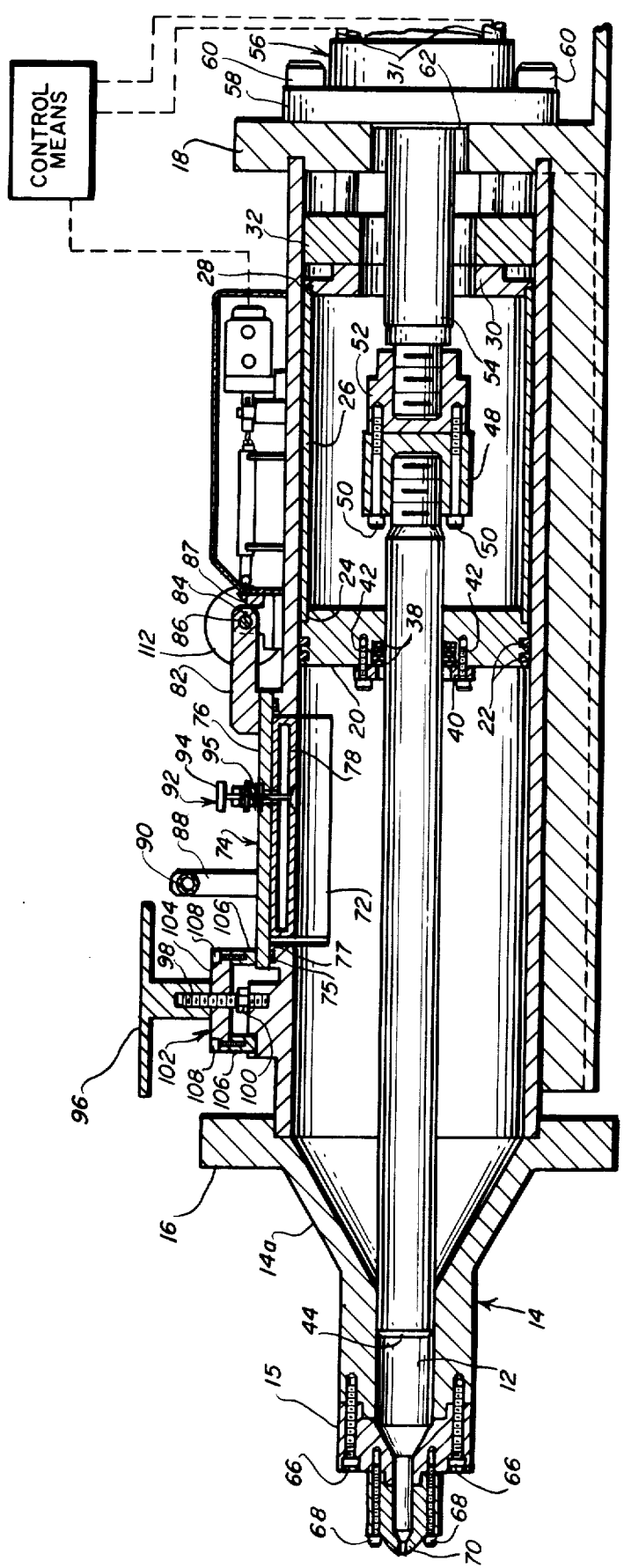
FIG. 2 is a simplified sectional view taken through the line 2—2 of FIG. 1.

Referring now to the drawing, there is shown in FIGS. 1 and 2, and injection unit which includes a stuffing cylinder 10 that is disposed in coaxial relationship to an injection cylinder 12. The injection cylinder 12 is formed within a body member 14 which is cylindrical on its exterior surface adjacent to the injection cylinder 12 and which forms a truncated cone 14a on both the interior and exterior surfaces thereof. The truncated cone 14a is intermediate the injection cylinder 12 and the stuffing cylinder 10. The injection cylinder extends from the truncated cone 14a within body member 14 into cylindrical extension section 15. The member 14 and section 15 are provided with a temperature controlled jacket (not shown) through which a fluid (not shown) is conducted to maintain a temperature appropriate to the particular plastic compound. Ordinarily, this temperature will be greater than ambient and less than the barrel temperature desirable when molding a thermoset compound. The temperature control may be accomplished with resistance elements within a reservoir (not shown) of the fluid being circulated. A flange 16 extends from the truncated cone 14a portion thereof outwardly and is disposed proximate to the stuffing cylinder 10. The flange 16 engages, in the preferred embodiment, four tie rods (not shown) which extend to a plate 18 disposed at the right-hand end as viewed of the stuffing cylinder 10. The structural combination of the tie rods, body member 16 and the stuffing cylinder 10 provide a rigid combination which is capable of carrying the high forces which are imposed by the injection and stuffing mechanism.

The stuffing mechanism includes a stuffing piston or plunger 20 having sealing rings 22, 22 disposed at the periphery thereof for engagement with the stuffing cylinder 10. A circular notch 24 is provided in the stuffing plunger 20 for fixed engagement with a cylindrical element 26 which similarly engages in a fixed manner a circular notch 28 provided in a cap 30 disposed at the opposite end thereof. The cap 30 is fixed by bolts (not shown) to a crosshead 32 which is also disposed for sliding movement within stuffing cylinder 10, as are cap 30, cylinder element 26 and stuffing plunger. A plurality of hydraulically operated rams 31 engage the crosshead 32 and in response to control means 34 urge the stuffing plunger 20 towards or away from the injection cylinder 12.

In coaxial relationship to the stuffing plunger 20 is an injection piston or plunger 36 which is sized for sealing engagement with the injection cylinder 12. The injection piston 36 passes through the center of stuffing plunger 20 and seals 38, retainer 40 and bolts 42, 42 are provided for the retention thereof. The leftmost end as viewed of injection piston 36 is provided with a chamfer 44 for easy engagement of the injection piston 36 with the injection cylinder 12. As will be apparent, the throw of the injection piston is such that it will, during part of its stroke, be completely withdrawn from the injection cylinder 12 and must necessarily pass from the truncated cone 14a of body member 16 into the injection cylinder 12 during the operation of the machine. The opposite end of the injection piston 36 is provided with threads 36a which engage a first coupling member 48. A plurality of bolts 50 (two shown) to a second coupling member 52 which is in turn fixed by threads to a hydraulic ram 54.

The hydraulic ram 54 is carried within a cylinder 56 which is shown broken away. The cylinder 56 includes a flange 58 by which the cylinder is fixed to plate 18 by a plurality of cap bolts 60 (two shown). A piloting boss 62 is provided on cylinder 56 for proper alignment of the cylinder with the injection piston 36. Not visible in front of cylinder 56 is a hydraulic cylinder 31, which together with a second cylinder 31 behind cylinder 56 is fixed to the crosshead 32.

Disposed in fixed relationship to the body member 14 is the injection cylinder extension section 15 which is secured by a plurality of bolts 66, 66 (two shown). Carried on the injection cylinder extension section 15 is a nozzle section which is secured in fixed relationship thereto by a plurality of bolts 68 (three shown). The tip 70 thereof is dimensioned and configured for sealing engagement with an associated mold.

Disposed on the upper surface of the stuffing cylinder 10 is a port 72 for loading plastic compound into the stuffing cylinder. The port 72 is selectively closed by a loading cover or door 74 having a concave interior face and a planar exterior face. Clearance is provided at the leftmost extremity of door 74 with respect to the port 72 because of the normal arc of the door as it is opened. Sealing around the port 72 against the door 74 is accomplished by means of a seal 75 disposed in a groove 77. The rigidity of the door 74 is increased by a plate 76 in combination with the concave interior structure 78 fixed thereto. The door 74 is fixed by bolts (not shown) to hinge 82 which is in turn fixed by a key 84 to bar or shaft 86. A stop 87 is fixed to a support 89 within which the bar 86 rotates. The support 89 is fixed to the exterior of stuffing cylinder 10. The door 74 is provided with handle uprights 88, 88 and grip element 90 fixed thereto, as well as a vacuum release valve 92. The valve comprises an integral handle, stem and poppet 94. The poppet portion thereof is urged against a seat on box-like member 78 by a spring 95. The door 74 is selectively retained in place by a locking wheel 96 which engages a stud 98 carried by the stuffing cylinder 10. A nut 100 is provided for positive locking between the stud 98 and the stuffing cylinder 10. The locking wheel 96 bears when tightened against a yoke 102 which comprises bar 104, legs 106, 106 and bolts 108, 108.

Fixed to shaft 86 are two cams 112, 112 which are identical in contour and which are angularly indexed with movement of the shaft 86 which is carried by a support 89 fixed to the stuffing cylinder 10. Opening the door rotates the cams 112, 112 and through one cam follower and linkage 114 actuates a hydraulic interlock 116 and through another linkage 118 operates an electrical interlock 120. These interlocks function in conjunction with the control means to insure that the stuffing plunger may not move in a direction toward the nozzle when the loading door is in the opened position.

The control means comprises hydraulic valving switches, a hydraulic pressure source and other conventional control apparatus which, in the preferred embodiment, are electrical, mechanical and hydraulic and which control the movement of the various hydraulic ram and stuffing and injection pistons in the manner to be described hereafter.

In operation, the loading cover 74 is opened by releasing the locking wheel 96 and yoke 102. As the door is opened the hinge 82 will abut stop 87 and the door will be held in an oblique position. The rotation of shaft 86 will also rotate cams 112, 112 to actuate through linkages 114 and 118 hydraulic and electrical interlocks 116 and 120. The operation of these interlocks will, in conjunction with the control means 34, prevent any movement of the stuffing piston toward the nozzle 67.

The plastic compound is then directed into the stuffing cylinder 10 by suitable means; although in the embodiment shown, no provision for automatic loading is provided. Apparatus is well known in the art which would provide for automatic loading either of the gravity feed type or a positive mechanism for urging the compound into the stuffing cylinder 10. After the stuffing cylinder has been loaded with the stuffing piston 20 in the position shown in FIG. 2, and with the injection piston in the position also shown in FIG. 2 the loading cover 74 is closed and secured with locking wheel 96 and yoke 102. It is particularly desirable to have the stuffing cylinder retracted away from the nozzle tip 70 during loading to allow the maximum charge. It is similarly sound to have the injection piston in the position shown in FIG. 2 to prevent leakage of plastic compound out of the nozzle both when the compound is being loaded into the stuffing cylinder and also when the stuffing piston is first advanced towards the nozzle tip 70. In some cases, it may be particularly desired to load the stuffing cylinder more than once before injection is begun. In that particular case, the stuffing piston will be advanced to compress the plastic compound and then withdrawn so that an additional charge of plastic compound may be added to the stuffing cylinder 10. After completion of all loading operations, the stuffing piston is advanced sufficiently to build up a positive pressure which, in some cases, may be in the order of 500 psi on the molding material. Thereafter, the injection piston 36 will be withdrawn from the injection cylinder to allow the flow of molding material or compound into the injection cylinder. When the injection plunger is retracted from the injection cylinder a pressure differential is created between the compressed plastic in the stuffing cylinder and the vacated injection cylinder. This pressure differential draws the compressed plastic into the injection cylinder, which speeds up the cycle time of the machine and which gives better control of the plastic filling the mold, thereby assuring a more uniform shot. While the plunger is being retracted, the stuffing piston maintains a constant pressure on the plastic material. Once the injection cylinder has been filled and pressure is maintained on the material, the injection plunger 36 is moved forward in the injection cylinder under the control of the control means 34. This advance will continue until the required mold shot capacity has been displaced. The clamp mechanism for the mold (not shown) is closed as the injection piston moves toward the mold. The movement of the injection plunger toward the mold before it enters the injection cylinder will tend to cause a rise in pressure on the molding material within the stuffing cylinder. To avoid an undesirable increase in such pressure, the control means includes hydraulic pressure relief valving (not shown) to maintain a constant back pressure on the stuffing cylinder so that a constant fill pressure is maintained to the injection cylinder in the preferred embodiment. Once the injection plunger 36 is inserted into the injection cylinder 12, it is no longer necessary or desirable to maintain pressure on the molding material in the stuffing cylinder. At this time, the hydraulic pressure for the stuffing plunger is relieved by the control means 34. Additional cycles of the injection plunger 36 to mold additional parts in the associated mold may be accomplished without reloading of the stuffing cylinder 10. As reloading of the injection cylinder 12 is repeated the material in the stuffing cylinder 10 will be reduced to a point where it will be necessary to reload. In the event that reloading of the stuffing cylinder 10 is necessary, the injection piston 36 and stuffing piston 20 will be first moved to the position shown in FIG. 2.

In any one injection stroke, the hydraulic pressure supplied to hydraulic ram 54 which is coupled to injection piston 36 may be dropped after the initial injection to a holding pressure during the initial portion of a finite cure time which will depend upon the compound being molded as well as the contour and size of the part being molded.

During the remainder of the cure time the injection plunger 36 retracts in response to the movement of ram 54 with the injection cylinder 12 essentially entirely within stuffing cylinder 10. In this position, the stuffing cylinder 10 and injection cylinder 12 are in fluid communication. Thereafter the stuffing piston 20 is urged toward the nozzle 67 to completely fill the injection cylinder 12 with compound. With the stuffing piston 20 applying a predetermined pressure on the compound the injection plunger 36 is then moved toward nozzle 67 into injection cylinder 12 and upon reaching a predetermined pressure the injection plunger 36 is then moved away from the nozzle 67 a small finite amount without withdrawing the plunger from the injection cylinder 12. No further hydraulic pressure is applied to ram 54 during the remainder of the cure cycle. This small withdrawal is necessary to reduce the compound pressure at the nozzle 67 and injection cylinder 12. This movement prevents compound extrusion from nozzle 76 when the mold is thereafter opened. These events occur simultaneously with the cure time of the compound previously injected into the mold. At the end of the cure time, the clamp which holds the associated mold (not shown) is opened so that the molded part, together with the sprue, may be ejected.

It will be understood by those skilled in the art that the instant invention may be accomplished in many ways other than the particular embodiment which is shown and described herein. Such variations may relate to the control means, the use of cylinders which are not coaxial, driving means other than hydraulic for urging the pistons in the desired direction as well as various interlocks for proper protection of the operator.

It will be seen that the apparatus in accordance with the invention is particularly capable of handling fiberglass reinforced plastic compound without damaging the fiberglass elements as is true of injection molding apparatus heretofore known and which does not require a special preforming of the plastic compound. Similarly, it will be understood that the apparatus of the invention is capable of handling other plastic compound in addition to those which include fiberglass reinforced material.

We claim:

1. Apparatus for injecting plastic into an associated mold through a nozzle comprising
    a stuffing cylinder,
    an injection cylinder relatively smaller than and coaxially joined at one end to said stuffing cylinder and to said nozzle at its other end,
    a piston mounted within said stuffing cylinder for movement toward and away from said injection cylinder,
    an injection plunger extending coaxially through said piston for movement toward and into and away from and out of said injection cylinder to inject plastic through said nozzle,
    means for introducing plastic into said stuffing cylinder while said piston is positioned away from said injection cylinder and while said plunger is positioned within said injection cylinder,
    hydraulic means for operating said piston and injection plunger,
    and cyclically operable control means operable on said hydraulic means for operating in sequence,
    a. said piston toward said injection cylinder to compress said plastic in said stuffing cylinder,
    b. retracting said injection plunger from said injection cylinder to allow said plastic to be forced into said injection cylinder by said moving piston, and
    c. advancing said injection plunger into said injection cylinder to inject plastic therein through said nozzle into said mold.

2. The apparatus as described in claim 1, said means for introducing plastic into said stuffing cylinder including a selectively openable loading port disposed in the wall thereof to allow passage of plastic compound into said stuffing cylinder, and said stuffing cylinder having a door disposed in said loading port which is selectively positionable between an opened position and a closed position wherein said door prevents plastic compound from escaping out of said stuffing cylinder.

3. The apparatus as described in claim 2, further including electrical and hydraulic interlocks on said door which prevents operation of said stuffing piston when said door is in said opened position.

4. Apparatus as recited in claim 1, wherein said piston is retracted while said injection plunger is advancing toward said injection cylinder to maintain pressure substantially constant in said injection cylinder until said injection plunger enters said injection cylinder.

5. Apparatus as recited in claim 1, said control means being further operable on said hydraulic means to retract said plunger a finite distance within said injection cylinder to a holding position, said control means being further operable to maintain said plunger at said holding position for a predetermined period of time to allow the plastic to cure in the mold.

6. Apparatus as recited in claim 1, wherein said stuffing cylinder and injection cylinder are joined by a conical section.

7. The apparatus as described in claim 1, including means for terminating urging of said stuffing piston in a direction causing an increase in pressure at said nozzle when said injection plunger enters said injection cylinder.

* * * * *